(12) United States Patent
Asada et al.

(10) Patent No.: US 7,901,139 B2
(45) Date of Patent: Mar. 8, 2011

(54) HYDRODYNAMIC BEARING TYPE ROTARY DEVICE

(75) Inventors: Takafumi Asada, Osaka (JP); Hiroaki Saito, Ehime (JP); Daisuke Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 494 days.

(21) Appl. No.: 11/808,731

(22) Filed: Jun. 12, 2007

(65) Prior Publication Data
US 2008/0008408 A1    Jan. 10, 2008

(30) Foreign Application Priority Data
Jun. 16, 2006  (JP) .................. 2006-167207

(51) Int. Cl.
    *F16C 32/06* (2006.01)
(52) U.S. Cl. ........................................ 384/107
(58) Field of Classification Search .............. 384/100, 384/107, 112, 114, 115, 120; 310/90; 360/99.07, 360/99.08
See application file for complete search history.

(56) References Cited

U.S. PATENT DOCUMENTS

| | | | | |
|---|---|---|---|---|
| 6,264,368 B1* | 7/2001 | Tanaka et al. | ................ | 384/112 |
| 6,412,984 B2* | 7/2002 | Asai et al. | ................ | 384/107 |
| 6,749,339 B1* | 6/2004 | Murabe et al. | ................ | 384/100 |
| 6,805,489 B2* | 10/2004 | Nakagawa et al. | ........... | 384/114 |
| 7,147,376 B2* | 12/2006 | Shimizu et al. | ................ | 384/107 |
| 2004/0179294 A1* | 9/2004 | Asada et al. | ................ | 360/99.08 |
| 2006/0104554 A1* | 5/2006 | Yamamoto | ................ | 384/100 |
| 2006/0120642 A1* | 6/2006 | Hirata et al. | ................ | 384/100 |

FOREIGN PATENT DOCUMENTS

JP    61-10939    1/1986

OTHER PUBLICATIONS

Air viscosity chart, obtained from http://www.engineeringtoolbox.com/air-absolute-kinematic-viscosity-d_601.html [Mar. 22, 2010].*

* cited by examiner

*Primary Examiner* — James Pilkington
(74) *Attorney, Agent, or Firm* — Wenderoth, Lind & Ponack, L.L.P.

(57) ABSTRACT

In a hydrodynamic bearing type rotary device, relationships between the number of times of intermittence life, a bearing load, lubricating fluid viscosity, a bearing size, and the like are considered in order to provide a hydrodynamic bearing type rotary device which can secure appropriate intermittence life. In a hydrodynamic bearing type rotary device, a shaft is inserted into a bearing hole of a sleeve so as to be relatively rotatable. A value of a function (Nd) is set to be 100,000 or higher: wherein $Nd=\eta/(S \cdot Ff \cdot P \cdot D)$.

8 Claims, 17 Drawing Sheets

1) $P = Pu + Pl$
2) $Pl * S1 = Pu * S2$
3) $Pl = Pu * (S2/S1)$
4) $P = Pu + Pu * (S2/S1)$
   $= Pu * ((S1+S2)/S1)$
5) $Pu = P * (S1/(S1+S2))$ $P = Pu + Pl$

| S | material wear rate | | 74800 | constant |
|---|---|---|---|---|
| η | absolute viscosity | | 0.00300 | [N·S/m^2] |
| P | radial load | | 0.0400 | N |
| | | | 3.92 | Gr |
| D | shaft diameter | | 0.0024 | m |
| C | bearing radial gap | | 0.0000023 | m |
| L | length | | 0.0019 | m |
| f | rotation rate | | 10000 | rpm |
| ω | = 2·π·f/60 | | 1047 | rad/S |
| Fs | = (η·ω·D^2·L^2)/C^3 | | 5277245 | N/m |
| Ff | = P/(Fs*ω) | | 0 | -- |
| Nd | = η/(S·Ff·P·D) | | 5818 | number of times of intermittence (× 10000 times) |

FIG. 15

| S | material wear rate | | 74800 | constant |
|---|---|---|---|---|
| η | absolute viscosity | | 0.00410 | [N·S/m^2] |
| P | radial load | | 0.2860 | N |
| | | | 28.03 | gr |
| D | shaft diameter | | 0.0035 | m |
| C | bearing radial gap | | 0.0000023 | m |
| L | length | | 0.0031 | m |
| f | rotation rate | | 5400 | rpm |
| ω | = 2·π·f/60 | | 565 | rad/S |
| Fs | = (η·ω·D^2·L^2)/C^3 | | 22421361 | N/m |
| Ff | = P/(Fs*ω) | | 0 | -- |
| Nd | = η/(S·Ff·P·D) | | 243 | number of times of intermittence (× 10000 times) |

FIG. 16

HYDRODYNAMIC BEARING TYPE ROTARY DEVICE

BACKGROUND OF THE INVENTION

I. Technical Field

The present invention relates to a hydrodynamic bearing type rotary device using a hydrodynamic bearing.

II. Description of the Related Art

In recent years, recording and reproducing apparatuses and the like using discs to be rotated have experienced an increase in memory capacity and an increase in transfer rate for data. Thus, bearings used for such recording and reproducing apparatuses are required to have high performance and high reliability to constantly rotate a disc load with high accuracy. Accordingly, hydrodynamic bearings suitable for high-speed rotation are used for such rotary devices.

The hydrodynamic bearing type rotary device has a lubricating oil between a shaft and a sleeve, and generates a pumping pressure by hydrodynamic grooves during rotation. Thus, the shaft rotates in a non-contact state with respect to the sleeve in the hydrodynamic bearing type rotary device. Accordingly, a stable high-speed rotation is possible because there is no mechanical friction between the shaft and the sleeve during constant rotation.

Hereinafter, an example of conventional hydrodynamic bearing type rotary devices will be described with reference to FIGS. 10 through 13.

As shown in FIGS. 10 through 13 a conventional hydrodynamic bearing type rotary device includes a sleeve 21, a shaft 22, and a rotor 23 fixed to the shaft 22.

The shaft 22 is inserted into a bearing hole 21A of the sleeve 21 so as to be rotatable. On at least one of an outer peripheral surface of the shaft 22 and an inner peripheral surface of the sleeve 21, radial hydrodynamic grooves 21A and 21B. Bearing gaps near the radial hydrodynamic grooves 21A and 21B are filled with at least oil 24.

Operations of the conventional hydrodynamic bearing type rotary device having the above-described structure are as follows.

In the conventional hydrodynamic bearing type rotary device as described above, when the shaft 22 rotates, the hydrodynamic grooves 21A and 21B gather the oil 24 filled in the bearing gap to generate a pumping pressure between the shaft 22 and the sleeve 21.

In this way, the shaft 22 can rotate in a non-contact state with respect to the sleeve 21. With a magnetic head or an optical head (not shown), data can be recorded/reproduced to/from a rotating disc 31.

However, the above conventional hydrodynamic bearing type rotary device has the following problems.

As shown in FIG. 10, a small gap is secured between the sleeve 21 attached to the base 25 and the shaft 22 and the oil 24 is filled therein. In such a conventional hydrodynamic bearing type rotary device, when the device is started and stopped many times under a high temperature (for example, 70° C.), a force such as self weight and the like is applied to the rotor 23 in a radial direction. This causes the surface pressure on a surface of the sleeve 21 or the shaft 22 to become significantly high. As a result, bearing wear may be generated and the bearing may seize.

Furthermore, as shown in FIG. 11, when the hydrodynamic bearing type rotary device is put into an axis horizontal position and the device is started and stopped many times, the self weight of the rotor 23 is applied to the surface of the sleeve 21 or the shaft 22 more strongly, and bearing wear is generated even earlier. As a result, as shown in FIG. 13 showing a chart of accumulative failure rate of actual products of the hydrodynamic bearing type rotary device with the letter E, the bearing has seized early in some cases.

Moreover, as shown in FIG. 12, even when a sleeve 26 has sufficient length, when the hydrodynamic bearing type rotary device is started and stopped, a force such as self weight and the like is applied to the rotor 23 in a radial direction. This causes a surface pressure on a surface of the sleeve 26 or a shaft 27 to become high. As a result, bearing wear may be generated and the bearing may seize with a failure rate as shown by the letter E in the chart of FIG. 13.

As can be seen from the above experiment results, in the radial hydrodynamic bearing of the conventional hydrodynamic bearing type rotary device, surface pressure increases when the device is started and stopped under a high temperature condition of about 70° C. This may result in bearing wear to be generated and the bearing may seize or may be broken. Regarding intermittence operation life of the hydrodynamic bearing type rotary devices, an experimental theory called PV value has been established with respect to sliding bearings of a non-floating type. It has been proven that as the numerical value of product of radial load and rotation rate increases, bearing wear may become significant and the life becomes shorter.

However, in bearings of a floating rotational type such as hydrodynamic bearing type rotary device, the relationship of the intermittence life has not been theoretically explained. It has been difficult to estimate the length of the intermittence life.

SUMMARY OF THE INVENTION

An object of the present invention is to provide a hydrodynamic bearing type rotary device which is designed with conditions different from those in the conventional device to secure a suitable intermittence life by considering relationship of the intermittence life with radial bearing load, lubricating oil viscosity, bearing dimension, and the like.

A hydrodynamic bearing type rotary device includes a sleeve, a shaft, a hub rotor, a bearing surface and a lubricating fluid. The sleeve has a bearing hole. The shaft is inserted into the bearing hole of the sleeve so as to be relatively rotatable. The hub rotor is attached to either of the sleeve and the shaft which rotates. The bearing surface has hydrodynamic grooves formed on at least one of an outer peripheral surface of the shaft or an inner peripheral surface of the sleeve. The lubricating fluid is held in a gap between the shaft and the sleeve. A value of a function (Nd) represented by the following relational expression (1) or (4) is 100,000 or higher:

$$Nd = \eta/(S \cdot Ff \cdot P \cdot D) \tag{1}$$

$$Nd = I/(S \cdot Ff \cdot P \cdot D) \tag{4}$$

S: Material wear rate S=74800 (constant)

η: Absolute viscosity at 70° C. [N·S/m^2] (when the lubricating fluid is a liquid)

I: Viscosity corresponding constant I=0.00001 (when the lubricating fluid is a gas)

P: Load applied to one bearing [N]

D: Shaft diameter [m], the floating rotation corresponding function, Ff, is defined as follows:

$$Ff = P/(Fs \times \omega) \quad (2)$$

ω: Constant angular velocity of the rotary device [rad/S] (=2·π·f/60), and the stiffness corresponding function, Fs, is defined as follows:

$$Fs = (\eta \cdot \omega \cdot D^2 \cdot L^2)/C^3 [N/m] \quad (3)$$

$$Fs = (I \cdot \omega \cdot D^2 \cdot L^2)/C^3 [N/m] \quad (6)$$

L: Length of bearing [m]
C: Bearing gap [m].

In such an example, when the lubricating fluid such as oil, air or the like filled in a predetermined gap in the hydrodynamic bearing type rotary device is at a high temperature (for example, 70° C.), even when start and stop of the device is repeated, the value of the function (Nd) is set to be 100,000 or higher so that the surface pressure does not increase in order to prevent bearing wear from generating and the bearing from seizing.

The lubricating fluid may be oil such as ester oil on ionic liquid and the like, or a gas such as air and the like.

According to the hydrodynamic bearing type rotary device which is formed to satisfy the relational expression (1) or (4), even when starting and stopping of the device is repeated, an increase in the surface pressure and bearing wear is suppressed. Thus, the hydrodynamic bearing type rotary device can have the intermittence life of a predetermined value or higher. Further, such an effect of lengthening life can be achieved by having the value of the function (Nd) which satisfies the relational expression (1) or (4) irrespective of whether the liquid such as oil or the gas such as air is used as the lubricating fluid.

A hydrodynamic bearing type rotary device of the second invention is a hydrodynamic bearing type rotary device of the first invention, in which the value of the function (Nd) is 1,000,000 or higher.

With such a structure, even when starting and stopping of the device is repeated, the surface pressure does not increase and no bearing wear is generated. Thus, at least the bearing wear or seizure due to contact at starting and stopping of the device can be securely prevented. Thus, the life of the hydrodynamic bearing type rotary device can be lengthened.

A hydrodynamic bearing type rotary device of the third invention is a hydrodynamic bearing type rotary device of the first invention, in which the value of the function (Nd) is 500,000 or higher.

With such a structure, even when starting and stopping of the device is repeated, an effect that a oil remaining amount is maintained to a predetermined value or higher and a surface runout amount is maintained to a predetermined amount or lower can be achieved even in the case where the start test is performed for 50,000 times at an oil temperature of 70° C. when the oil is used as the lubricating fluid. As a result, while the life of the hydrodynamic bearing type rotary device is lengthened, the oil remaining amount is secured and the surface runout can be suppressed.

A hydrodynamic bearing type rotary device of the fourth invention is a hydrodynamic bearing type rotary device of the first invention, in which the lubricating fluid is a liquid.

In this example, the lubricating fluid filled in the predetermined gap in the hydrodynamic bearing type rotary device is a lubricating fluid such as oil and the like.

With such a structure, for example, the reduction of the lubricating fluid such as oil can be suppressed, and the life of the hydrodynamic bearing type rotary device can be lengthened.

A hydrodynamic bearing type rotary device of the fifth invention is a hydrodynamic bearing type rotary device of the fourth invention, in which the lubricating fluid is any one of ester oil, fluorine oil, silicon oil, and olefin oil.

With such as structure, by using the oil generally used as the lubricating fluid of the hydrodynamic bearing type rotary device, the effect of the lengthening the life can be achieved in the hydrodynamic bearing type rotary device with the predetermined gap being filled with the lubricating fluid.

A hydrodynamic bearing type rotary device of the sixth invention is a hydrodynamic bearing type rotary device of the first invention, in which the absolute viscosity of the oil is in a range from 2 to 5 centipoises (0.002 to 0.005 [N·S/m^2]) at 70° C.

With such a structure, by specifying the absolute viscosity when the oil used as the lubricating fluid of the hydrodynamic bearing type rotary device is at a high temperature (70° C.), the effect of the lengthening the life can be achieved further efficiently.

A hydrodynamic bearing type rotary device of the seventh invention is a hydrodynamic bearing type rotary device of the first invention, in which the lubricating fluid is a gas.

In this example, the lubricating fluid filled in the predetermined gap in the hydrodynamic bearing type rotary device is gas such as air and the like.

With such a structure, even in the hydrodynamic bearing type rotary device using a gas such as air and the like as the lubricating fluid, the effect of the lengthening the life can be achieved even when starting and stopping of the device is repeated under a high temperature (70° C.).

A hydrodynamic bearing type rotary device of the eighth invention is a hydrodynamic bearing type rotary device of the first invention, in which a gap formed between the bearing surface and the sleeve or the shaft has a width in a radial direction of 1 μm or longer and is substantially constant.

In this example, the lower limit is set for the width of the gap formed between the bearing surface and the sleeve or the shaft.

When the size of the gap is below 1 μm, there may be an adverse effect on the life of the bearing depending upon machining accuracy and/or surface roughness of the outer peripheral surface of the shaft and/or the inner peripheral surface of the sleeve.

By satisfying the condition of 1 μm or longer, stable life can always be secured irrespective of machining accuracy and/or surface roughness of the outer peripheral surface of the shaft and/or the inner peripheral surface of the sleeve.

A hydrodynamic bearing type rotary device of the ninth invention is a hydrodynamic bearing type rotary device of the first invention, in which the shaft is formed of stainless steel, high manganese chrome steel, or carbon steel. The sleeve is formed of a material obtained by treating stainless steel or copper alloy with electroless nickel plating, or DLC coating, sintered alloy including 90% or more iron, or a material obtained by forming a triiron tetroxide film on a surface of the sintered alloy including 90% or more iron.

In this example, a few types of materials are specified as materials for the shaft and the sleeve.

With such a structure, even when starting and stopping of the device is repeated under a high temperature (70° C.), the bearing wear of the shaft and the sleeve can be reduced in order to lengthen the life of the hydrodynamic bearing type rotary device.

A hydrodynamic bearing type rotary device of the tenth invention is a hydrodynamic bearing type rotary device of the first invention, in which the shaft has a diameter in a range from 2.0 to 6.0 mm and a rotational rate in a range from 360 to 15,000 rpm. A length of the bearing hole provided on the inner peripheral surface of the sleeve is in a range from 3.0 to 20.0 mm.

In this example, ranges of the diameter of the shaft, the rotational rate of the shaft or the sleeve, and the length of sleeve bearing hole are specified.

With such a structure, the bearing wear of the shaft and the sleeve can be reduced in order to lengthen the life of the hydrodynamic bearing type rotary device further efficiently.

A hydrodynamic bearing type rotary device of the eleventh invention is a hydrodynamic bearing type rotary device of the first invention, in which surface roughness of the sleeve inner surface opposing the shaft is in a range from 0.01 to 1.60 μm.

In this example, a numerical value range of the surface roughness of the sleeve surface opposing the shaft is specified.

With such a structure, by setting the above range of the surface roughness of the sleeve surface opposing the shaft, the bearing wear between two members can be reduced in order to lengthen the life of the hydrodynamic bearing type rotary device.

A recording and reproducing apparatus of the twelfth invention includes a hydrodynamic bearing type rotary device according to the first invention.

With such a structure, life of the recording and reproducing apparatus can be lengthened while the performance and quality being maintained.

According to the present invention, the hydrodynamic bearing type rotary device which can pursue longer life even under such a condition where starting and stopping of the device is repeated at a high temperature, can be realized.

BRIEF DESCRIPTION OF THE DRAWINGS

FIG. 15 is an illustrative diagram showing numerical values of parameters and function (Nd) in an example of the present invention.

FIG. 16 is an illustrative diagram showing numerical values of parameters and the function (Nd) in an example of the present invention.

DETAILED DESCRIPTION OF THE INVENTION

Hereinafter, a hydrodynamic bearing type rotary device 15 according to an embodiment of the present invention will be described with reference to FIG. 1.

[Structure of Hydrodynamic Bearing Type Rotary Device 15]

Figure 1:
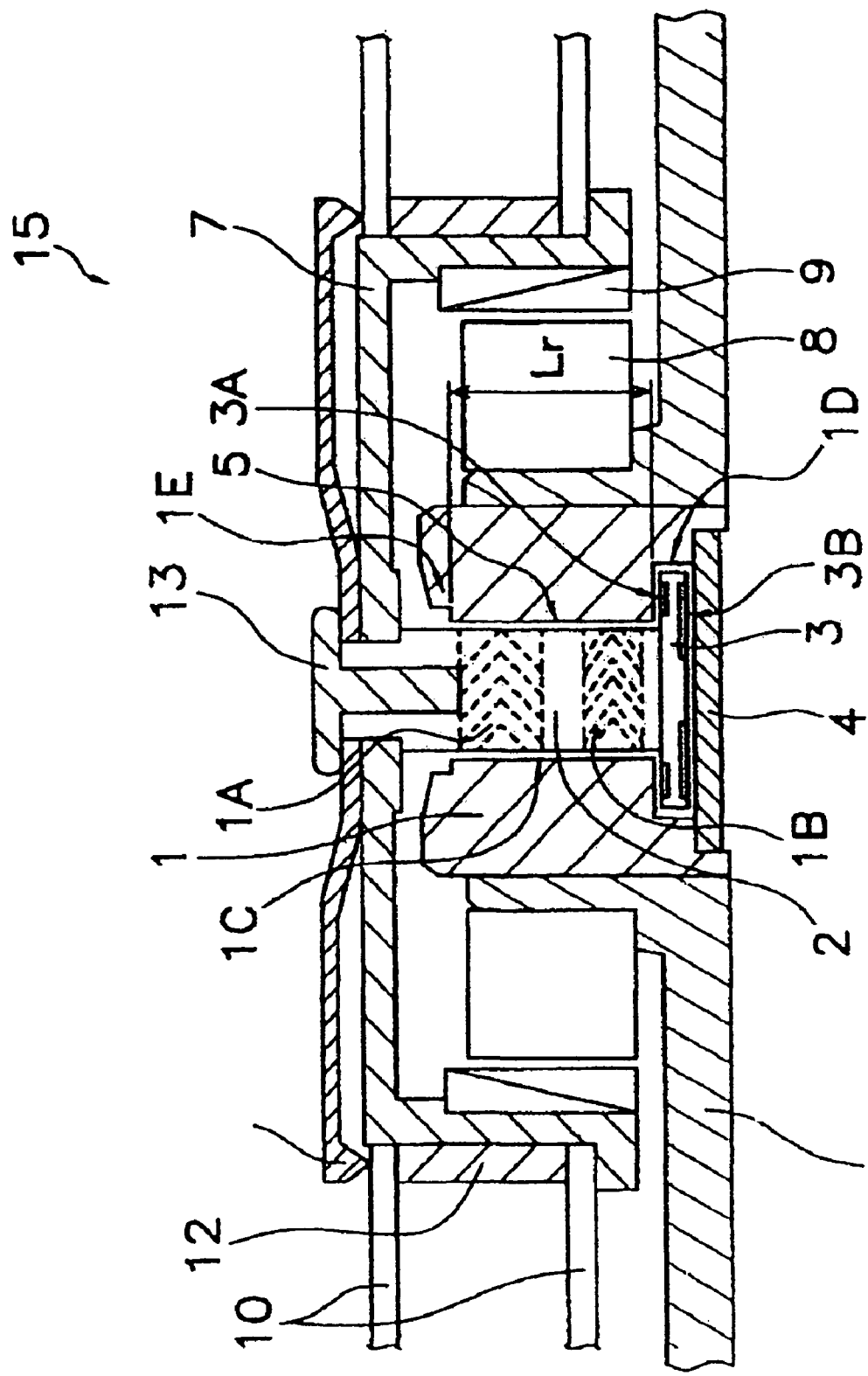
FIG. 1 is a cross-sectional view of a hydrodynamic bearing type rotary device according to an embodiment of the present invention.

As shown in FIG. 1, the hydrodynamic bearing type rotary device 15 according to the present embodiment includes a sleeve 1, a shaft 2, a thrust plate 4, a lubricating oil (lubricating fluid) 5 such as oil or the like, a base 6, a hub rotor 7, a stator 8, and a rotor magnet 9.

The shaft 2 is integral with the flange 3. The shaft 2 is inserted into a bearing hole 1C of the sleeve 1 so as to be rotatable.

The flange 3 is attached to a lower end of the shaft 2, and is accommodated within a recessed portion 1D of the sleeve 1.

On at least one of an outer peripheral surface of the shaft 2 and an inner peripheral surface of the sleeve 1, radial hydrodynamic grooves 1A and 1B are formed. On a surface of the flange 3 which opposes the sleeve 1 and a surface of the flange 3 which opposes the thrust plate 4, thrust hydrodynamic grooves 3A and 3B are formed.

The thrust plate 4 is fixed to the sleeve 1.

As shown in FIG. 1, in an opening portion of the sleeve 1, an oil reservoir 1E is formed by machining the sleeve 1 or the shaft 2 to have a circumferential groove.

Bearing gaps near the hydrodynamic grooves 1A, 1B, 3A and 3B as shown in FIG. 1 are filled with at least the lubricating oil 5.

The hub rotor 7 is fixed to the shaft 2. To the hub rotor 7, the rotor magnet 9, a disc 10, a spacer 12, a clamper 11, and a screw 13 are fixed. On the other hand, the sleeve 1 is fixed to the base 6, and the stator 8 is also fixed to the base 6 so as to oppose the rotor magnet 9.

<Operations of Hydrodynamic Bearing Type Rotary Device 15>

Operations of the hydrodynamic bearing type rotary device 15 which has the above-described structure are as follow.

In the hydrodynamic bearing type rotary device 15 of the present embodiment, when an electric current is supplied to the stator 8, a rotary magnetic field is generated and a rotary force is applied to the rotor magnet 9. This causes the rotor magnet 9 to start rotating with the hub rotor 7, the shaft 2, the flange 3, the disc 10, the spacer 12, the clamper 11, and the screw 13.

The hydrodynamic grooves 1A, 1B, 3A and 3B gather the lubricating oil 5 with such rotation. Accordingly, pumping pressures are generated between the shaft 2 and the sleeve 1, between the flange 3 and the sleeve 1, and between the flange 3 and the thrust plate 4.

In this way, the shaft 2 can be rotated in a non-contact state with respect to the sleeve 1 and the thrust plate 4. With a magnet head or an optical head (not shown), data can be recorded/reproduced to/from a rotating disc 10.

Examples

An example of the hydrodynamic bearing type rotary device 15 having the above-described structure will be described with reference to FIGS. 1 through 9.

In start and stop operation, i.e., intermittent operation of the hydrodynamic bearing type rotary device, the following hypothesis are established with respect to the number of times of intermittent operations until the end of life comes due to contact between the shaft 2 and the sleeve 1 causing friction which makes rotation of the bearing heavier.

Figure 2:
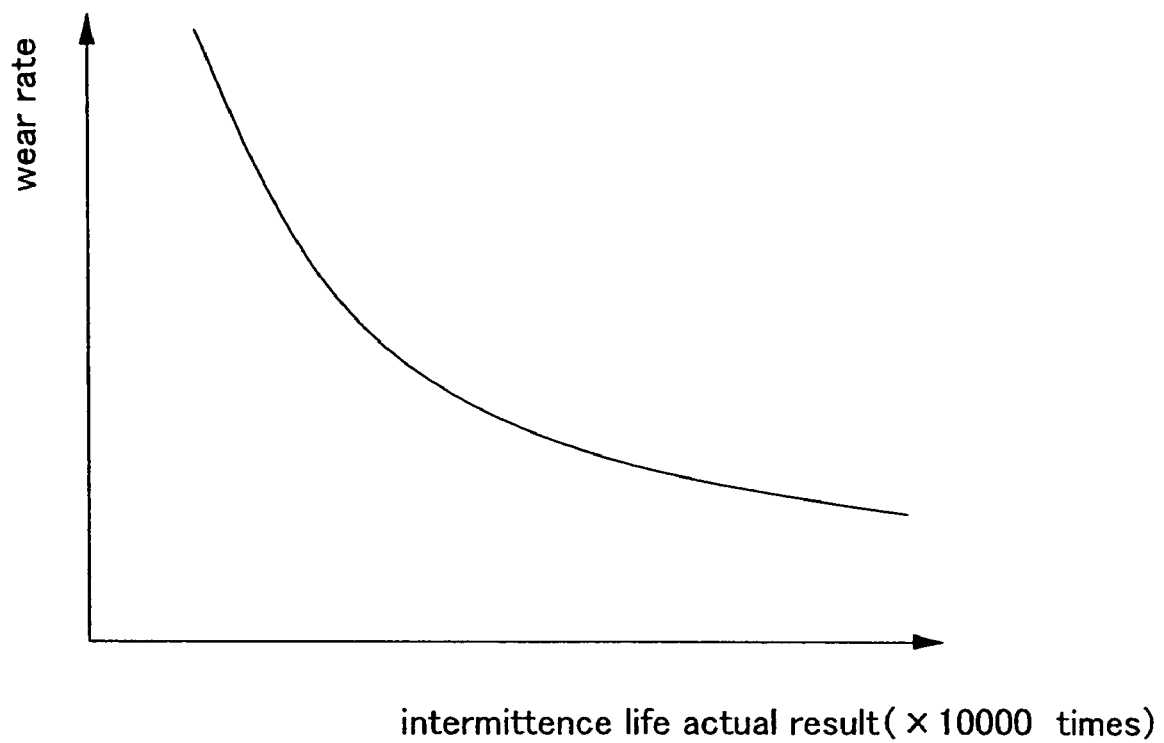
FIG. 2 is a graph showing relationship between intermittence life of a bearing and wear rate in the hydrodynamic bearing type rotary device.

(i) In the radial hydrodynamic bearing 15, there is contact in low speed operation until hydrodynamic pressure is generated sufficiently during the intermittent operation at a high temperature to generate small wear particles. As shown in FIG. 2, the generated wear rate is inversely proportional to the life in the intermittent operation.

(ii) When the amount of wear or magnitude of friction reaches to a certain level and a radial bearing gap 1C is filled, the bearing 15 is broken. However, in a hydrodynamic bearing type rotary device of a typical disc recording apparatus or the like, failure occurs when a certain small amount of wear is generated.

(iii) The amount of generated wear is affected by the wear rate of the material. However, there is no significant difference in the wear rates of the materials for contact between metal materials which generally used for the sleeve 1 and the shaft 2 in the hydrodynamic bearing 15 for disc rotary devices (for example, stainless steels, copper alloy, nickel plated surfaces, DLC coated surfaces). The amount of generated wear and generated wear rate are assumed to be proportional to a circumferential velocity when the member starts to float and a radial load, and inversely proportional to the viscosity of the lubricating oil 5 (in this case, including oil, grease, ionic liquid, gasses such as air). The circumferential velocity when the member starts to float is proportional to a product of a rotation rate when the member starts to float and the shaft diameter.

Figure 3:
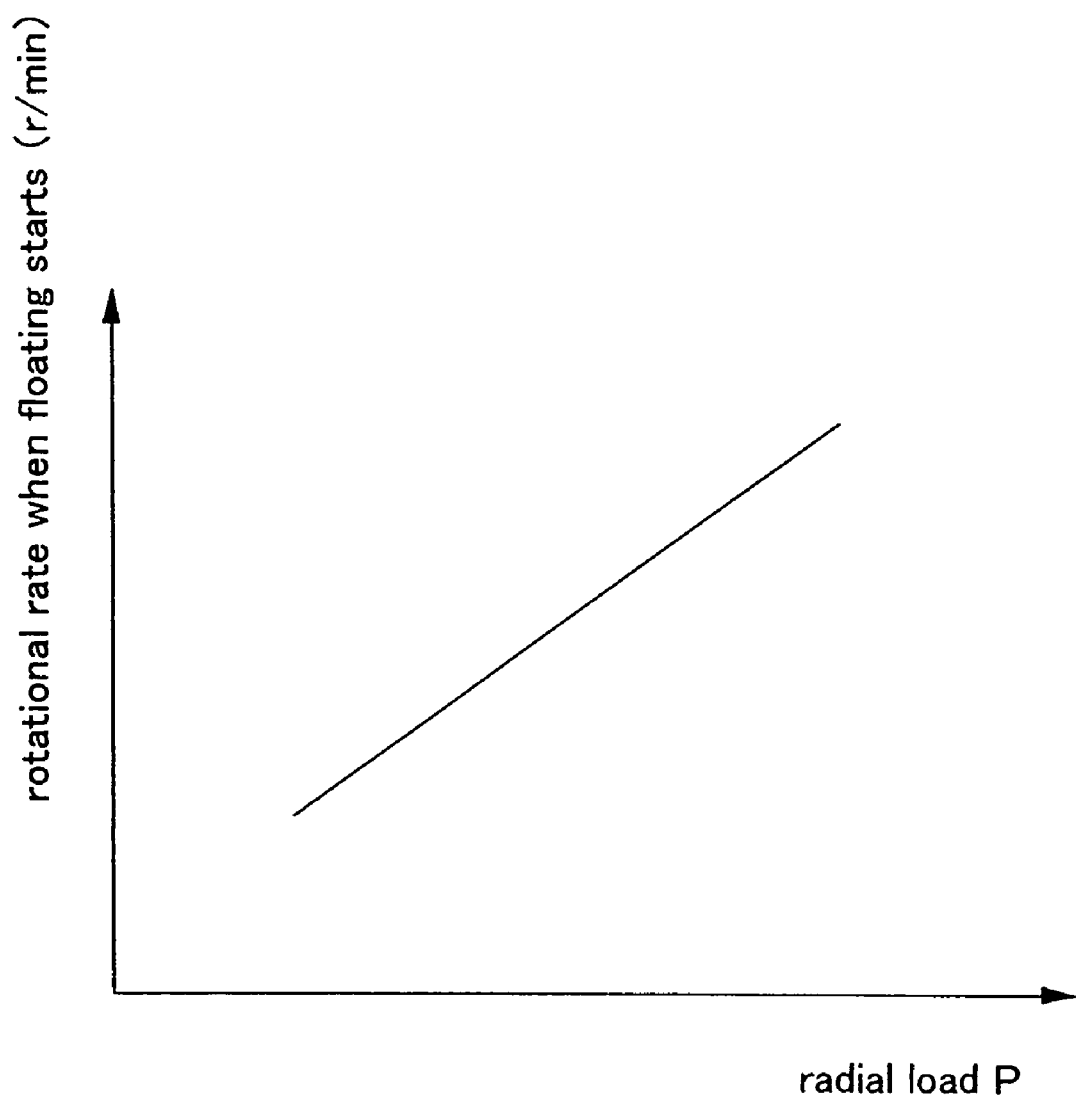
FIG. 3 is a graph showing relationship between a radial load of the bearing and rotational rate at floating in the hydrodynamic bearing type rotary device.
Figure 4:
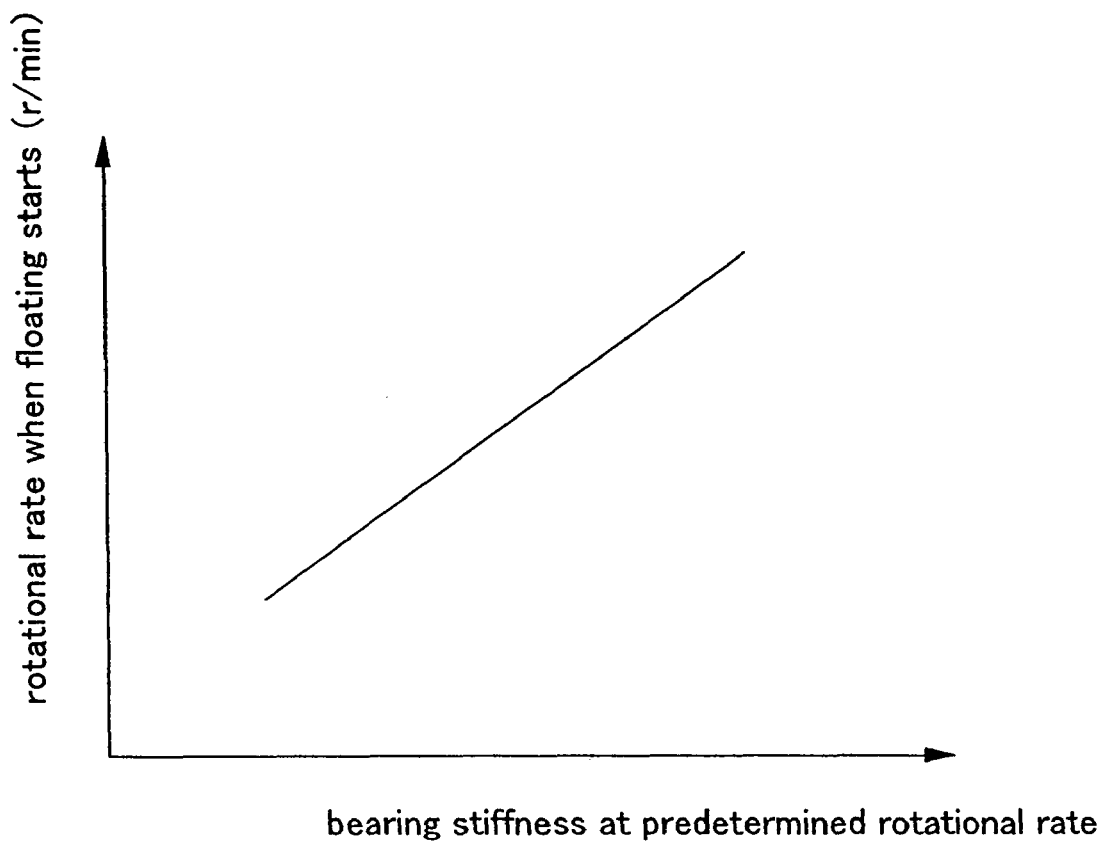
FIG. 4 is a graph showing relationship between bearing stiffness and rotational rate when floating starts in the hydrodynamic bearing type rotary device.

(iv) The rotation rate for the hydrodynamic bearing 15 starts to float is proportional to the radial load as shown in FIG. 3. Also, as shown in FIG. 4, it is proportional to hydrodynamic bearing stiffness at a steady rotational rate of the rotary device 15 per unit (hydrodynamic bearing stiffness at a certain rotational rate).

(v) Regarding the radial load, load applied to upper and lower surfaces of radial bearing are separately obtained. If the product is disassembled and the rotor is moved out, the weight can be confirmed in the balance on the scales, and the center of the gravity and load sharing can be confirmed by a string suspension method.

(vi) When oil or grease is used as the lubricating oil 5, the viscosity may change by a factor of several times due to a temperature. In such cases, it is considered that the viscosity on the friction surface between the sleeve 1 and the shaft 2 where the friction is actually generated in the bearing has a direct influence. It is assumed that the viscosity at 70° C., which is relatively high temperature, affects the intermittence life.

The experiment was conducted and the results demonstrate that these hypotheses were correct in most of the part. A hydrodynamic bearing type rotary device with new design values and design conditions which are different from conventional ones is obtained.

Based on the above hypotheses, the present inventors define the function (Nd) (hereinafter referred to as radial bearing life corresponding function) as follows.

$$Nd = \eta/(S \cdot Ff \cdot P \cdot D) \quad (1)$$

S: Material wear rate S=74800 (constant)
$\eta$: Absolute viscosity at 70° C. [N·S/m^2]
P: Load applied to one radial bearing [N]
D: Shaft diameter [m]

The radial floating rotation corresponding function, Ff, is defined as follows.

$$Ff = P/(Fs \times \omega) \quad (2)$$

$\omega$: Constant angular velocity of the rotary device [rad/S] (=2·$\pi$·f/60)

The stiffness corresponding function, Fs, is defined as follows.

$$Fs = (\eta \cdot \omega \cdot D^2 \cdot L^2)/C^3 \ [N/m] \quad (3)$$

L: Length of bearing [m]
C: Bearing radial gap [m]

Herein, expression (1) is a numerical expression based on the above hypotheses (i), (iii) and (vi).

Expression (2) is based on a numerical expression based on the above hypothesis (iv).

Expression (3) is a general numerical expression representing a stiffness of a radial bearing using incompressible fluids.

Herein, $\omega$, the constant angular velocity of the rotary device [rad/S], represents a rotational speed of the product performing a normal operation, for example, 5400 rpm or 12000 rpm for a hard disc apparatus.

A specific example is as shown below.

For example, the shaft is designed to have a diameter in a range from 2.0 to 6.0 mm and a rotational rate in a range from 360 to 15000 rpm. The inner peripheral surface of the sleeve 1 serves as the bearing hole and usually has two radial bearing surfaces. The length of the bearing hole is in a range from 3.0 to 20 mm. The shaft 2 or the sleeve 1 rotates and a torque load is applied to a rotating part. A load applied to one bearing is 300 grams (2.94 newtons) or less. A large number of design parameters as mentioned above are involved. However, a new combination of design values which are less likely to generate wear were found through experiment.

Now, examples using the relational expressions (1) and (4) as described above will be described.

The values of the parameters and the calculated value of the function (Nd) were as shown in FIG. 15.

In another example, the values of the parameters and the calculated value of the function (Nd) were as shown in FIG. 16.

Figure 6:
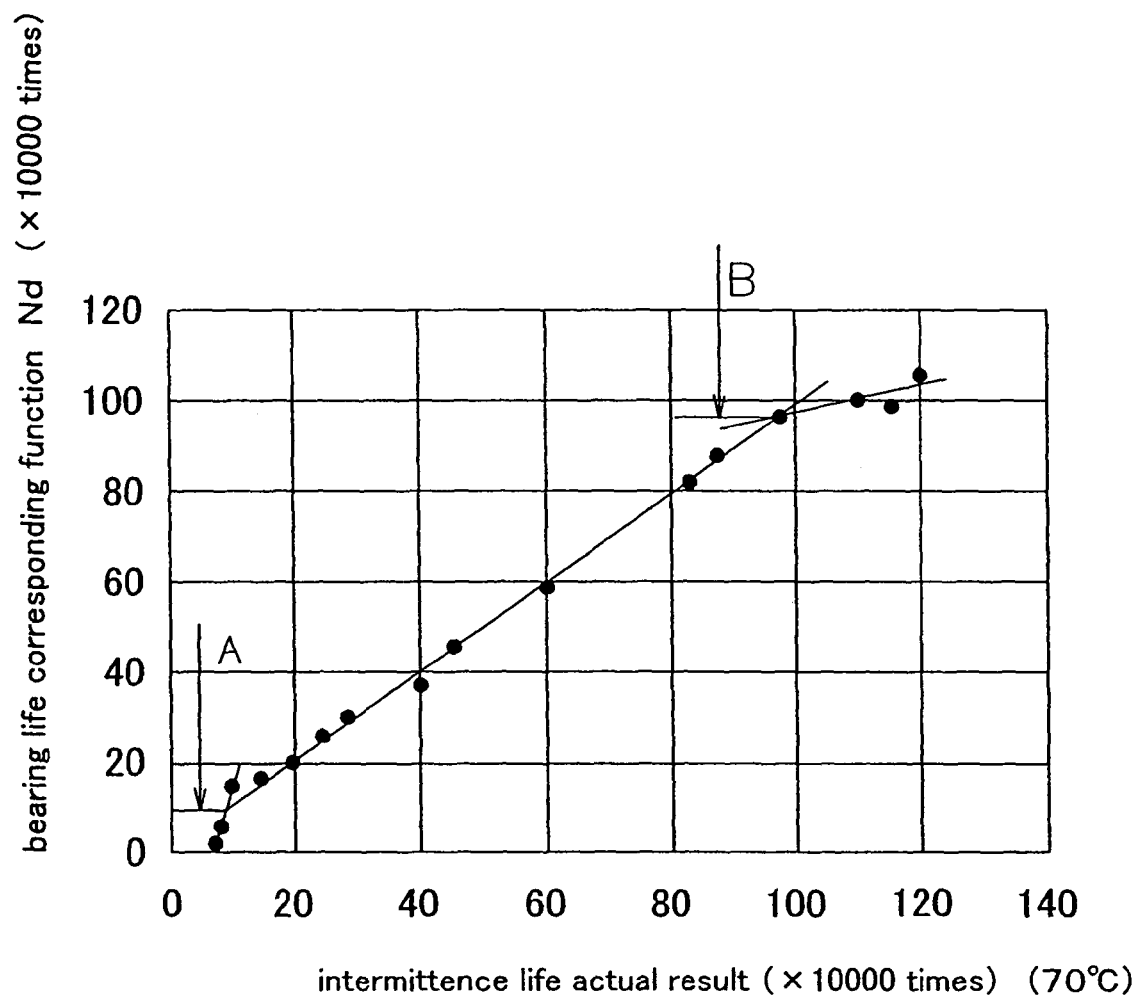
FIG. 6 is a graph showing relationship between the life corresponding function and actual life of the hydrodynamic bearing type rotary device.
Figure 7:
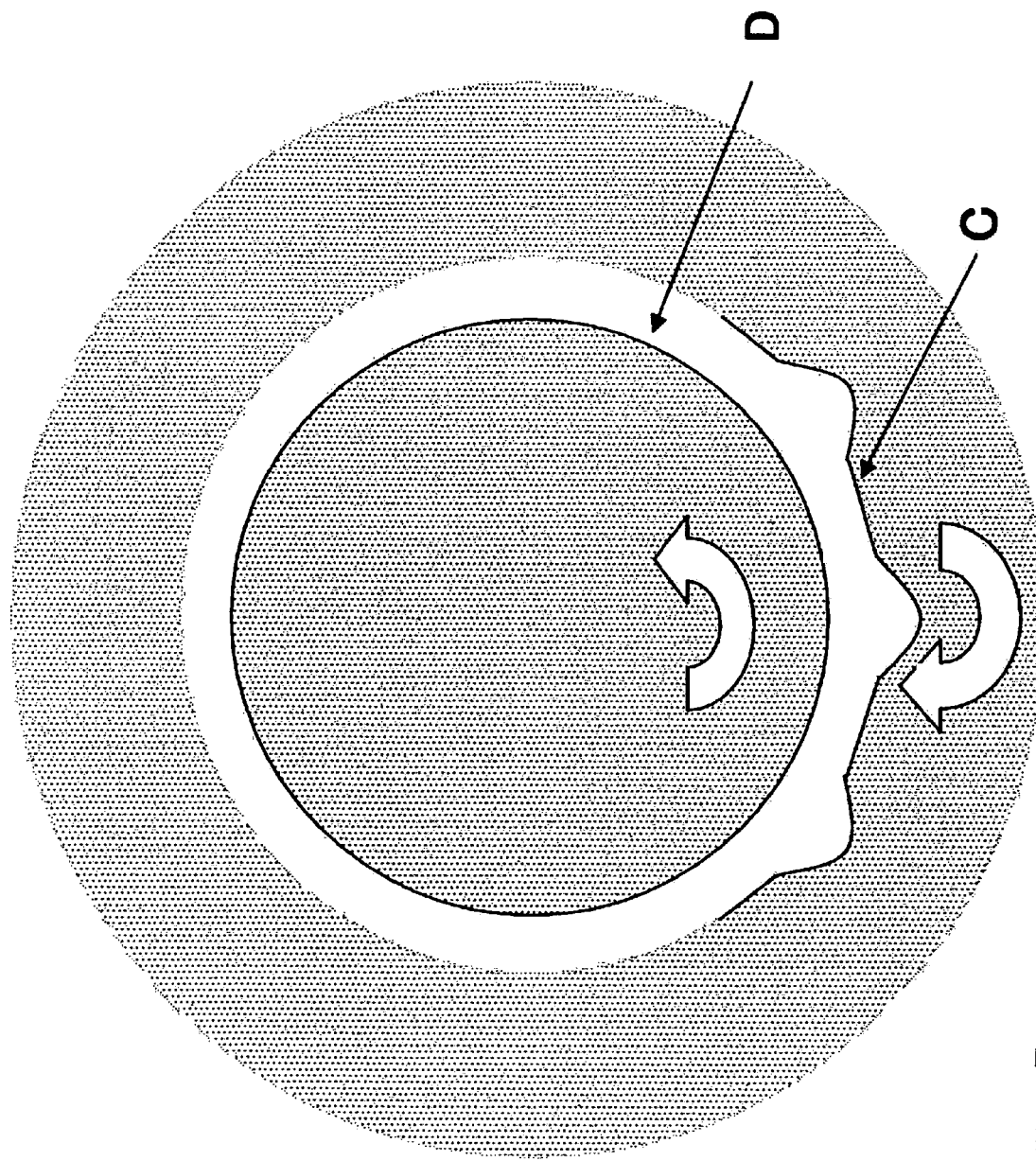
FIG. 7 is an illustrative diagram of contact surface of the hydrodynamic bearing type rotary device.

Correlation between the radial bearing life corresponding function (Nd) and the intermittence life actual values (H) of the actual hydrodynamic bearing type rotary device 15 is shown in FIG. 6. In FIG. 6, data obtained during development and trial production of a large number of hydrodynamic bearing type rotary devices for this twenty years by the present inventors are plotted to the graph. As can be seen from FIG. 6, the radial bearing life corresponding function (Nd) and the intermittence life actual values (H) of the actual hydrodynamic bearing type rotary device 15 matches the experiment results to a sufficient extent where S is a constant of 74800 in the expression (1) and the correlation is recognized. By comparing the experiment results, bends are found in the graph.

As shown in FIG. 6, a bend appears around the value of the radial bearing life corresponding function (Nd) of about 100,000. It is found that when the value of Nd does not exceed 100,000, the life of the hydrodynamic bearing type rotary device 15 comes to an end is a significantly short amount of time. It is considered that, when Nd is 100,000 or higher, on a surface of the sleeve 1 or the shaft 2, a good lubrication is achieved between surfaces as indicated by letters C and D in FIG. 7 and wear is within a scope of normal wear (such as break-in wear, rubbing wear and the like). On the other hand, when Nd is below 100,000, the wear takes a different form and becomes abnormal wear (for example, severe wear or the like).

As shown in FIG. 6, it is also found that the intermittence life significantly increases when the numerical value of the radial bearing life corresponding function (Nd) is 1,000,000 or higher. It is considered that this is because the surface pressure where the bearing surface contact becomes very small when Nd is 1,000,000 or higher and is within the elastic limit of the bearing component material of the sleeve 1 and the shaft 2. Thus, the amount of wear is almost zero and the design condition which allows the device to be used for the number of times of intermittent operations and last semi-permanently can be achieved.

In the experiment results, most of the conventional designs do not have the values of the radial bearing life corresponding function (Nd) within the preferable range or even when the values of Nd overlap the preferable range, the viscosity of the oil 5 used is too high so that the viscosity at a low temperature is too high causing the rotation performance to deteriorate. Thus, desirable performance cannot be obtained in general.

From these facts, as shown in FIG. 6, in the hydrodynamic bearing type rotary device 15 of the present invention, by setting the numerical value of the radial bearing life corresponding function (Nd) to be 100,000 or higher, no abnormal wear is generated even in use under a high temperature. Thus, the hydrodynamic bearing type rotary device has a high reliability which is required for a usual consumer product such as a disc rotary device and the like.

Furthermore, by setting the numerical value radial bearing life corresponding function (Nd) to be 1,000,000 or higher, the bearing component material of the sleeve 1 and the shaft 2 is maintained within the elastic limit. Thus, the hydrodynamic bearing type rotary device 15 with substantially no wear which can be used almost semi-permanently and can be used for a special purpose can be obtained.

In the present example, a material of the shaft 2 is stainless steel, high manganese chrome steel, or carbon steel. A material of the sleeve 1 is stainless steel, copper alloy, or such a material treated with electroless nickel plating, or DLC coating. Further, it is found that by using a sintered alloy including 90% or more iron or a material obtained by forming a triiron tetroxide film on a surface of the sintered alloy including 90% or more iron, a certain wear resistance property is obtained. Further, a material which is processed to have a surface roughness of the radial bearing surface is within the range from 0.01 to 1.60 μm. The surface roughness of the shaft 2 is set to be in a range from 0.01 to 0.2 μm to obtain a certain wear resistance.

The surface roughness was measured using a surface roughness checker with a method which is generally called arithmetic mean deviation Ra (a setting of cutoff value is 0.25 mm) or a ten points average height Rz.

When a copper alloy which is not treated with plating is used as bearing materials of the sleeve 1 and/or the shaft 2, chemical reaction between the oil and the copper content accelerate deterioration and may shorten the life of the bearing by about 10%. However, the oil shear corresponding function E defined in the present invention without considering these factors.

Figure 5:
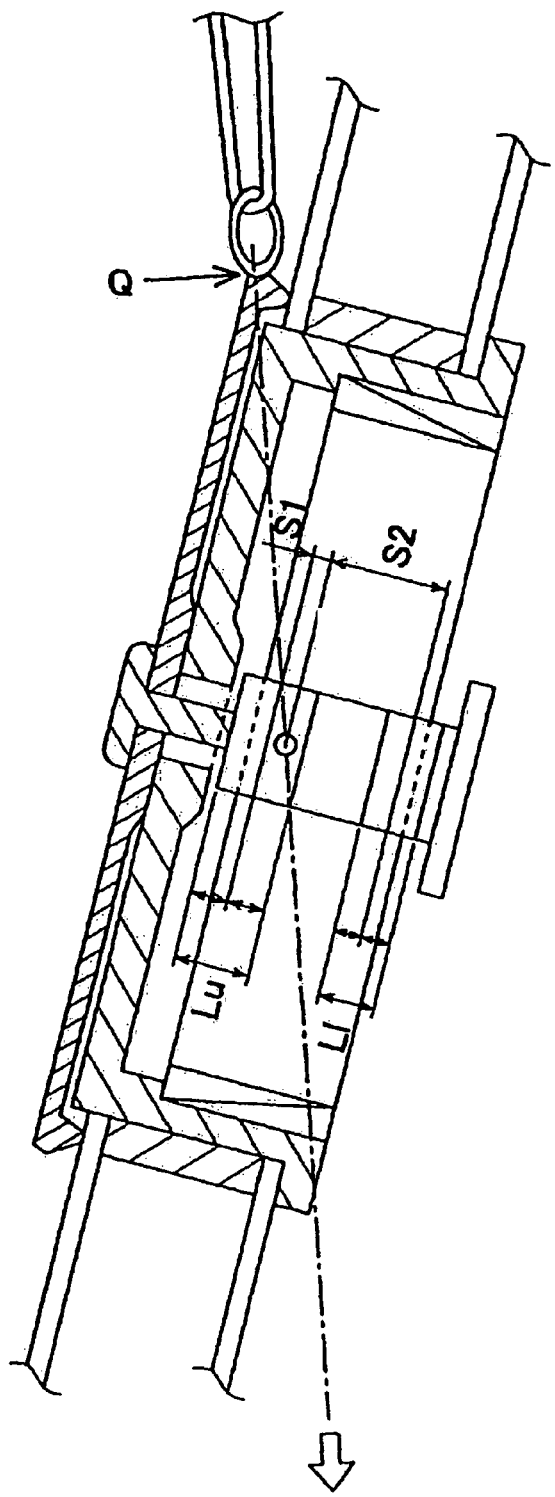
FIG. 5 is a diagram illustrating how to obtain center of gravity and a load of a rotating member of hydrodynamic bearing type rotary device.

If values of the radial loads applied to upper and lower radial bearings respectively are not known in the hydrodynamic bearing type rotary device shown in FIG. 1, they can be obtained by the following method, which is illustrated in FIG. 5.

FIG. 5 shows the rotating member, i.e., the shaft 2, the flange 3, the hub rotor 7, the rotor magnet 9, the disc 10, the spacer 12, the clamper 11, and the screw 13 removed from the hydrodynamic bearing type rotary device of the present invention as they are integrated to each other, and a sufficiently thin string is attached to a position Q to suspend the member in a natural state. By suspending a part corresponding to the rotating member, a center of gravity which is a point of intersection of the axial center with a line extended from the string can be obtained. Generally, this method is called a string suspension method.

In this way, as shown in FIG. 5, load Pu applied to a central portion of the upper bearing width is obtained from the relational expression:

$$Pu = P \times (S1/(S1+S2)).$$

On the other hand, load Pl applied to a central portion of the lower bearing width is obtained from the relational expression:

$$Pl = P - Pu.$$

As described above, by obtaining the position of the center of the gravity of the component which serves as the rotating member, the values of the radial loads applied to the upper and lower radial bearings respectively.

In this way, even there are two radial bearing gaps as in the hydrodynamic bearing type rotary device shown in FIG. 1, the numerical value of the radial bearing life corresponding function (Nd) can be calculated by substituting the value of Pl or Pu for P in the above relational expression (1).

In the present example, the viscosity of the oil injected into the gap between the shaft and the sleeve at 70° C. affects the life. In the present example, ester oil is used as a lubricating oil. When the lubricating oil including fluorine oil, silicon oil, olefin oil or the like as a main component of the oil is used, there is some influence on the life of the hydrodynamic bearing type rotary device. However, it is confirmed that such an influence is limited to about 15% or lower by another experiment. Thus, these parameters are not considered in the oil shear corresponding function E defined in the present example.

The viscosity of the oil 5 is calculated as follows. First, a small amount of the oil 5 is examined with an analysis device called gas chromatography (not shown) to check the composition of the oil. The type of the oil is identified by the obtained composition. Once the type of the oil is known, the viscosity of the oil 5 at 40° C. and 100° C. can be obtained based on data shown in a document, Principle of Application to Lubricating Oil, Seiichi Konishi, Corona Publishing Co., Ltd., pp. 311-313. For example, when it is known that the type of the oil is dibasic acid ester by an analysis device, the viscosity of the oil is 7.4 to 10.4 Cst (centistokes) at 40° C. and 1.9 to 2.3 Cst at 100° C. Thus, it is known that the viscosity at 70° C. is about 3.9 Cst. Next, the general values of the specific gravity of these oils are about 0.9 for the ester oil, about 1.4 for the silicon oil, and about 1.8 for the fluorine oil. Since the specific gravity of the dibasic acid ester is about 0.9, the absolute viscosity of the oil at 70° C. is calculated as follows: 3.9 (Cst)×0.9=3.51 (centipoises). By converting the unit, the absolute viscosity, 0.00351 [N·S/m^2], is obtained.

According to the experiment, the device having a value of the radial bearing life corresponding function (Nd) which is preferable as the hydrodynamic bearing can be designed irrespective of the viscosity value of the oil 5 based on the expression mentioned above. However, if the viscosity of the oil 5 at 70° C. is too large, the rotational torque at a low temperature becomes too heavy to obtain good performances. A preferable range for the viscosity of the oil 5 calculated is a range from 2 to 6 Cst.

Figure 8:
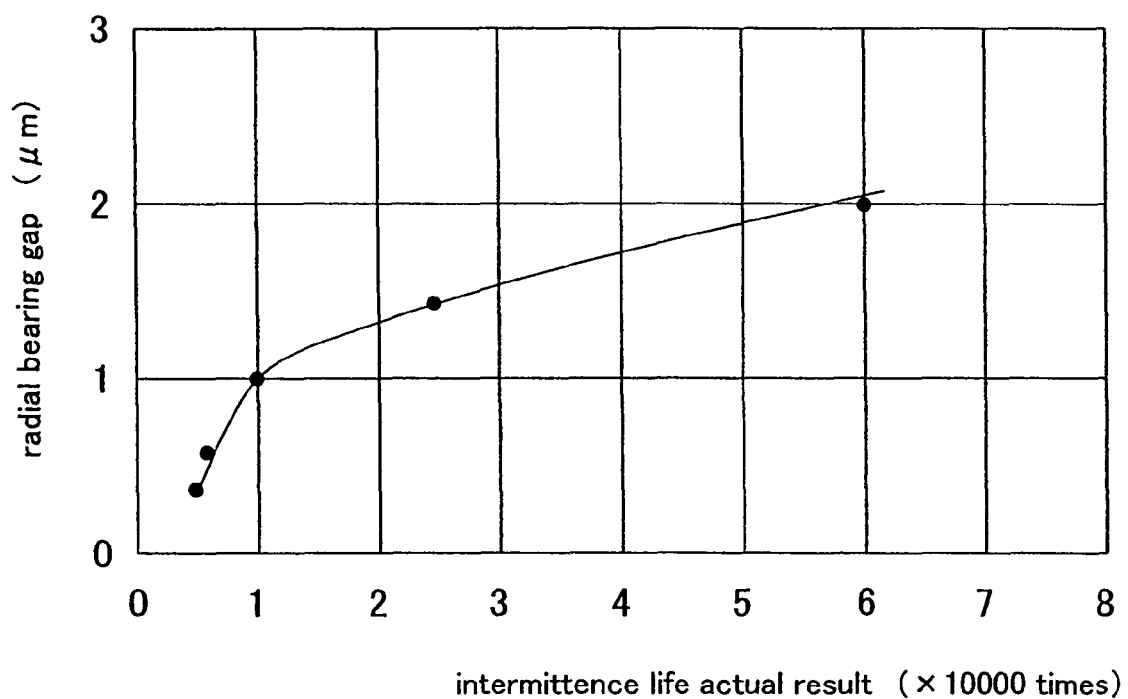
FIG. 8 is a graph showing relationship between radial gap and life in the hydrodynamic bearing type rotary device.

In the present example, the width of the radial bearing gap C1 between the sleeve 1 and the shaft 2 in the hydrodynamic bearing type rotary device 15 according to the above embodiment has a relationship as shown in the graph of FIG. 8 with the actual life ratio of the hydrodynamic bearing (H).

Specifically, as the radial bearing gap of the radial bearing surface formed by the sleeve 1 and the shaft 2 becomes smaller, the stiffness of the hydrodynamic bearing becomes larger. The intensity against an external force increases. On the other hand, it is found that, when the gap in the radial direction (C) below 1 μm, machining accuracy of the outer peripheral surface of the shaft 2, machining accuracy of the inner peripheral surface of sleeve 1, and/or surface roughness have adverse influence that abrasion is readily generated. Accordingly, it is preferable to set the radial bearing gap of 1 μm or wider in order to lengthen the life of the hydrodynamic bearing type rotary device.

As described above, by setting the numerical value of the radial bearing life corresponding function (Nd) to be 100,000 or higher, no abnormal wear is generated even in use under a high temperature. Thus, a hydrodynamic bearing type rotary device having a high reliability which is required for a usual consumer product such as a disc rotary device and the like.

Furthermore, by setting the numerical value radial bearing life corresponding function (Nd) to be 1,000,000 or higher, the bearing component material of the sleeve 1 and the shaft 2 is maintained within the elastic limit. Thus, the hydrodynamic bearing type rotary device 15 with substantially no wear which can be used almost semi-permanently and can be used for a special purpose can be obtained.

When the hydrodynamic bearing type rotary device of the present invention is applied to a hard disc recording and reproducing apparatus 43, not only that wear is not generated at the bearing portion but also other features are obtained.

Figure 17:
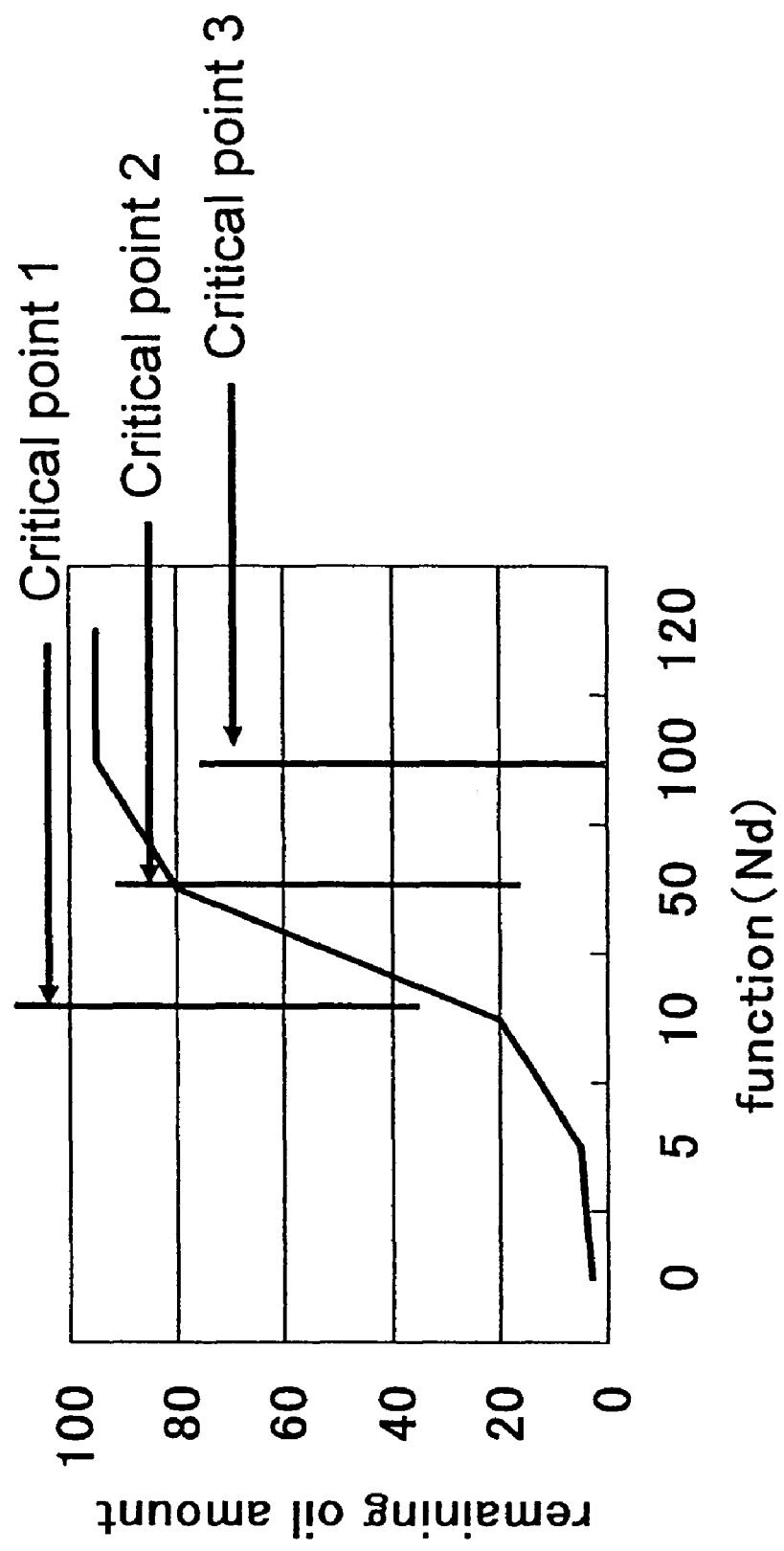
FIG. 17 is a graph showing relationship between the function (Nd) and a remaining oil amount at a high temperature in an example of the present invention.

For example, in the present example, when the hydrodynamic bearing type rotary device of the present invention is incorporated into the hard disc recording and reproducing apparatus 43, the above-mentioned function (Nd) has a good relationship with a remaining amount of the oil as shown in FIG. 17.

In the graph shown in FIG. 17, there is critical point 1 around where the value of the function (Nd) is around 100,000. At the critical point 1, the inclination of the line indicating the remaining oil amount becomes steep. Near where the function (Nd) is around 500,000, another critical point 2 appears, and a significantly good result that the remaining oil amount is about 80%. Regarding the function (Nd) which has been described above, a good result can be obtained having the numerical value 500,000 as the critical point for the remaining oil amount. Further, when the function (Nd) is around 1,000,000, the critical point 3 appears and the remaining oil amount becomes about 95%.

In the structure of the hard disc recording and reproducing apparatus 43 of the present example, a temperature rise in the apparatus 43 can be suppressed. Thus, there is almost no temperature change during recording and reproducing operation performed between the magnetic disc 10 and the recording head 42. Since the temperature rise is the apparatus 43 is suppressed, the oil 5 filled in predetermined gaps in the hard disc recording and reproducing apparatus 43 are less likely to evaporate due to a high temperature. Thus, the recording and reproducing apparatus of a high quality can be obtained.

These are assumed to be the reason why correlation is established between the function (Nd) and the remaining oil amount.

Figure 18:
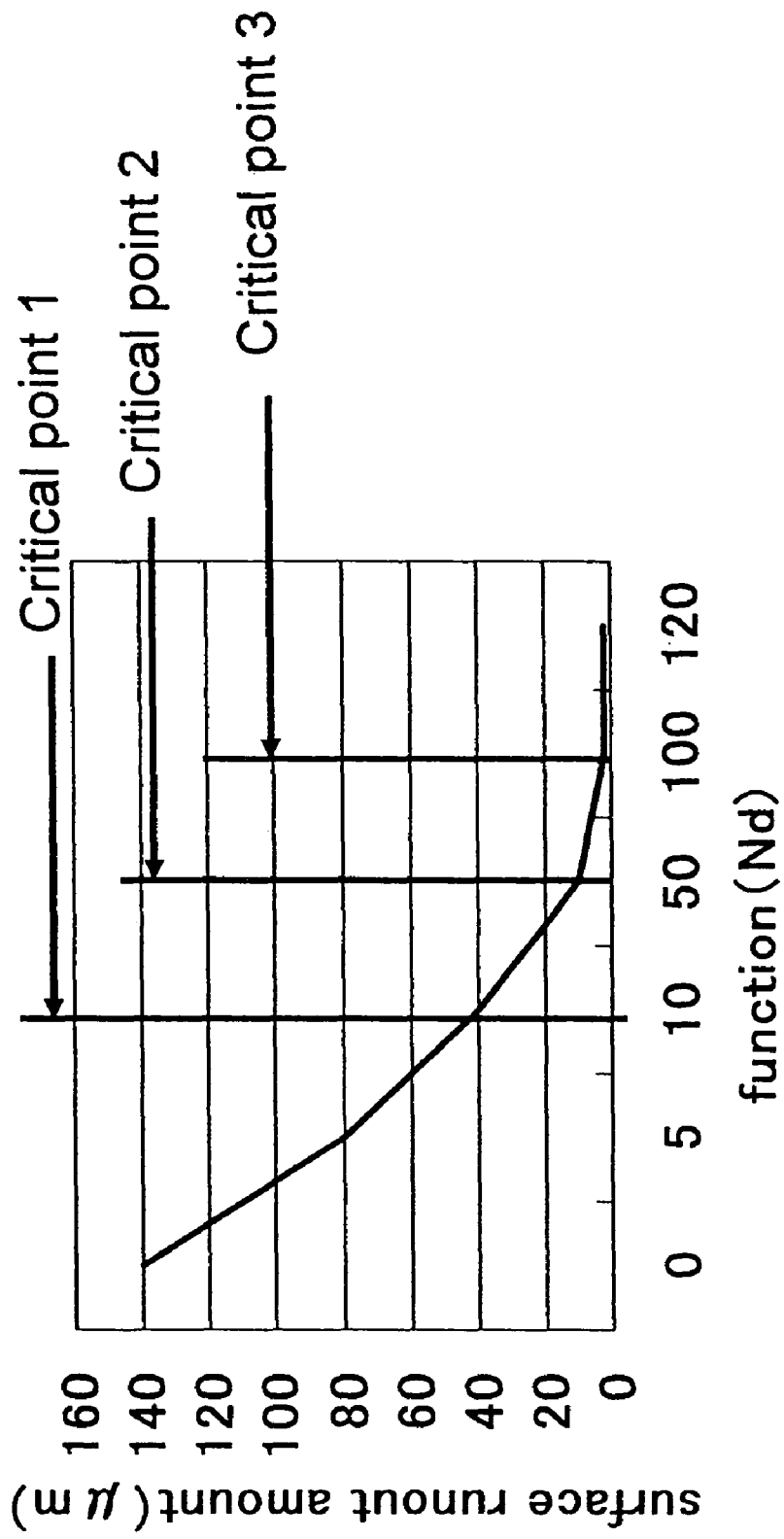
FIG. 18 is a graph showing relationship between the function (Nd) and a remaining oil amount at a high temperature in an example of the present invention.

Similarly, regarding the relationship between the function (Nd) and surface runout and/or whirling of the disc 10, good results as shown in FIG. 18 are obtained.

As shown in the graph of FIG. 18, there is critical point 1 where the function (Nd) is around 100,000. At the critical point 1, inclination of the line indicating the amount of surface runout is suddenly reduced. Near where the function (Nd) is more than 500,000, another critical point 2 appears, and a significantly good result that the surface runout amount of the disc 10 is about 10 μm or less. Regarding the function (Nd) which has been described above, a good result can be obtained having the numerical value 500,000 as the critical point in view of the surface runout. Further, when the function (Nd) is around 1,000,000, the critical point 3 appears and the remaining oil amount becomes almost zero in the following range.

As described above, in the hydrodynamic bearing type rotary device according to the present invention, by specifying the numerical range for the magnitude of the above-mentioned function (Nd), not only the effect of lengthening the life but also an effect of suppressing the reduction of the oil during an operation under a high temperature and an effect of suppressing surface runout and the like of the disc 10 can be achieved. As a result, it can be said that specifying the structure of the hydrodynamic bearing type rotary device with the numerical range for the function (Nd) is a significant thing to do.

Other Embodiments

An embodiment of the present invention has been described above. However, the present invention is not limited to the above embodiment. Various modifications can be made without departing from the gist of the invention. Other embodiments will be described below.

(A)

In the above embodiment, a lubricating oil such as oil, which is an incompressible fluid, is injected into predetermined gaps formed between the shaft and the sleeve. However, the present invention is not limited to such an example.

For example, gas bearing which includes a compressible gas such as air as a lubricating oil filled in the gaps can provide similar experiment result as the above-described hydrodynamic bearing type rotary device.

Figure 9:
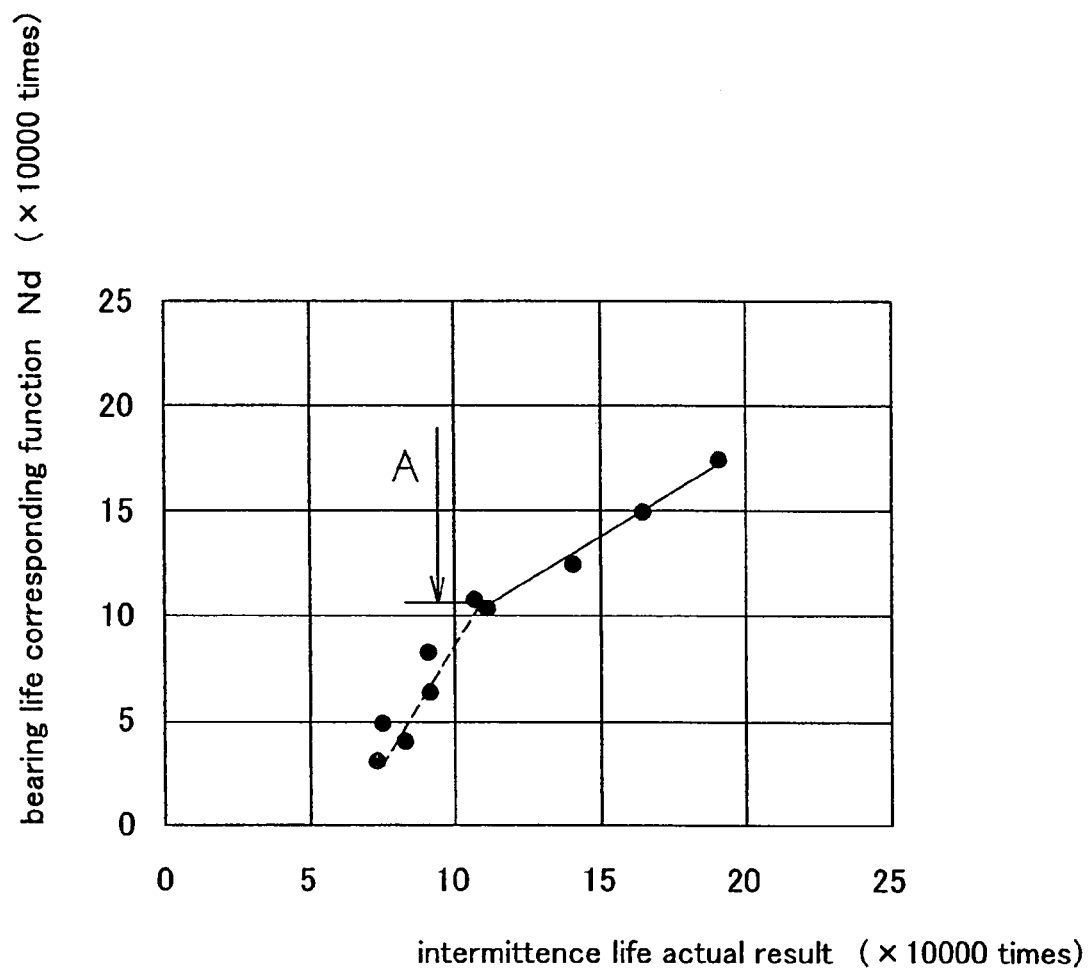
FIG. 9 is a graph showing relationship between the life corresponding function and actual life in a gas bearing.
Figure 10:
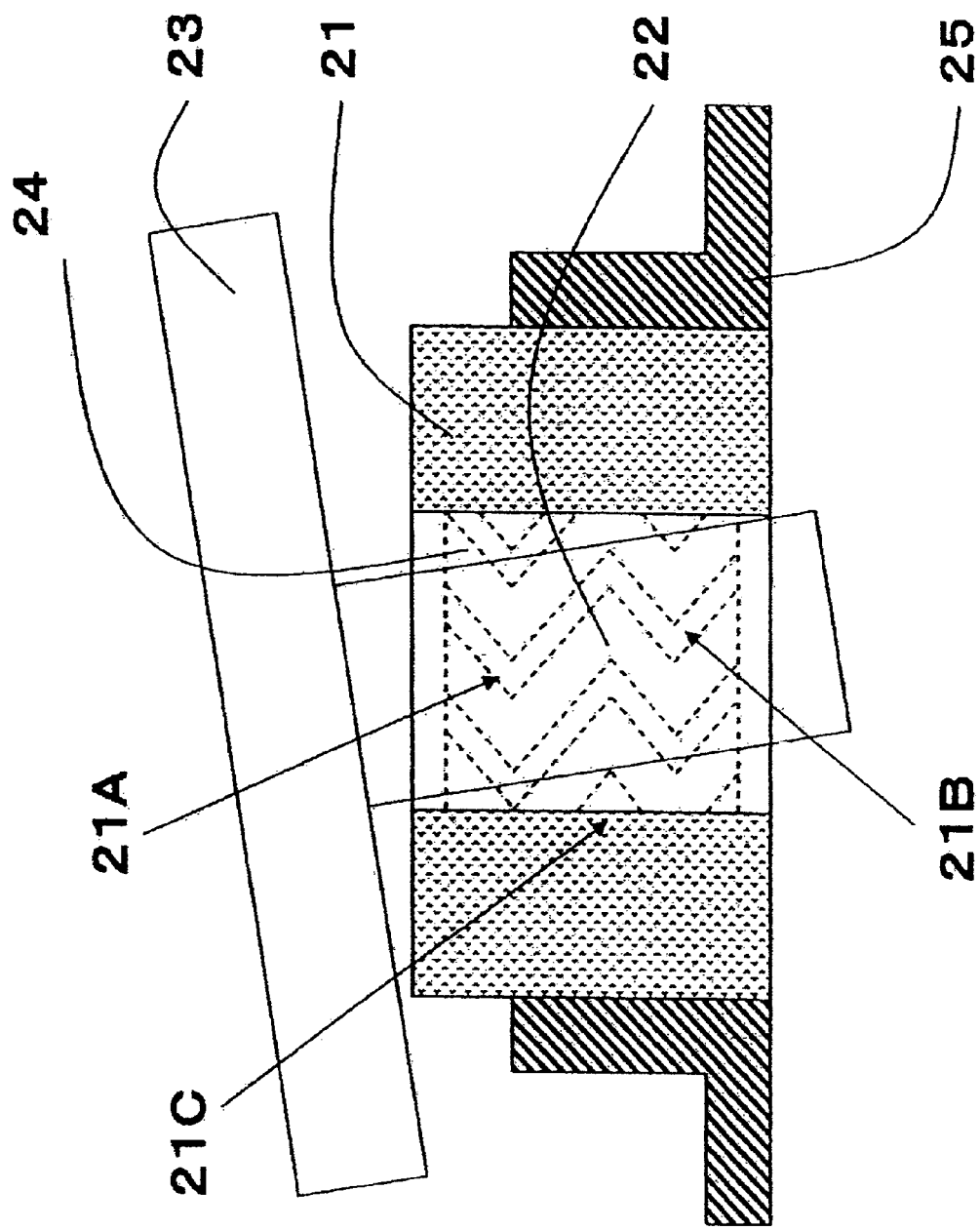
FIG. 10 is a cross-sectional diagram showing a structure of a conventional hydrodynamic bearing type rotary device.
Figure 11:
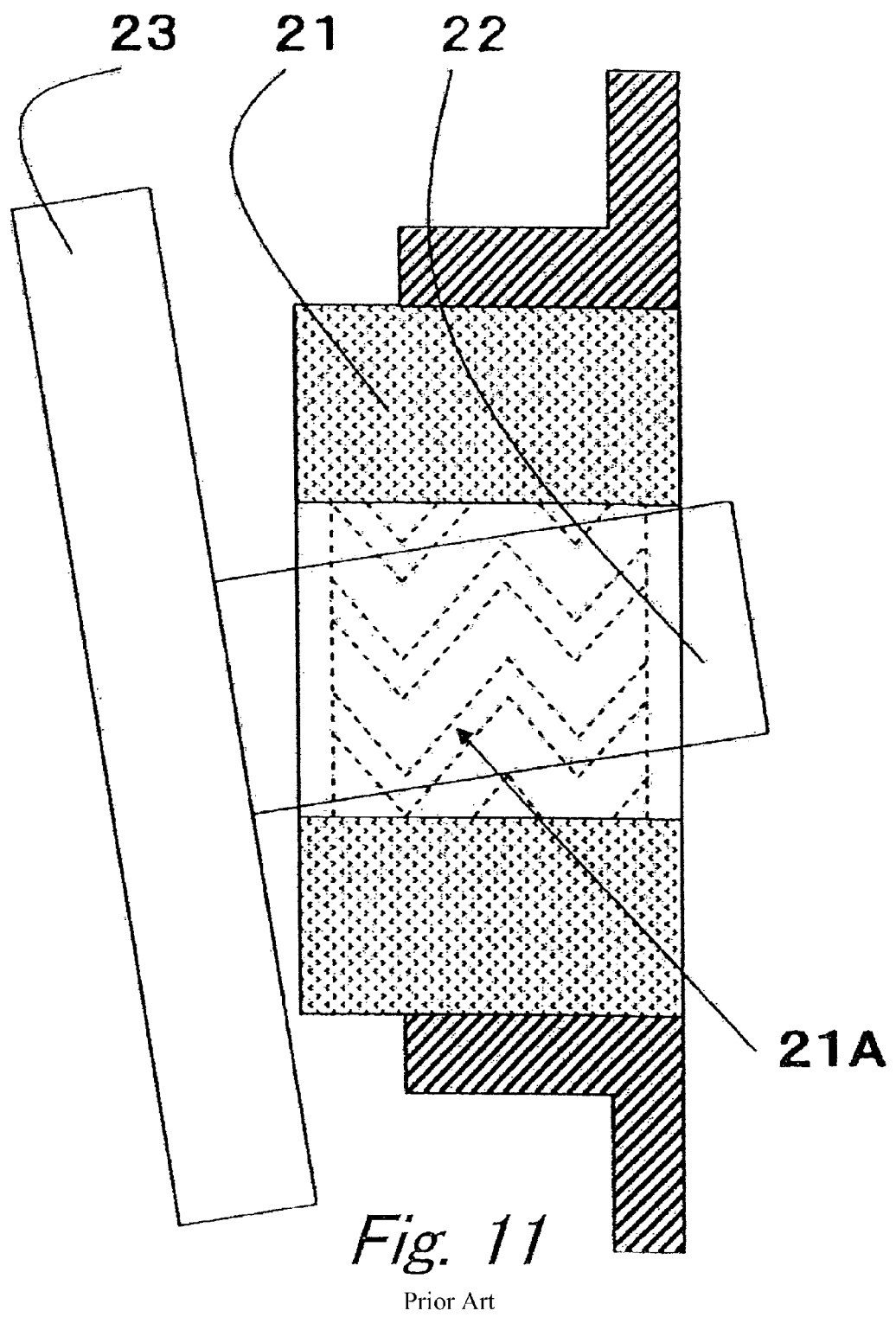
FIG. 11 is a cross-sectional diagram showing a structure of a conventional hydrodynamic bearing type rotary device.
Figure 12:
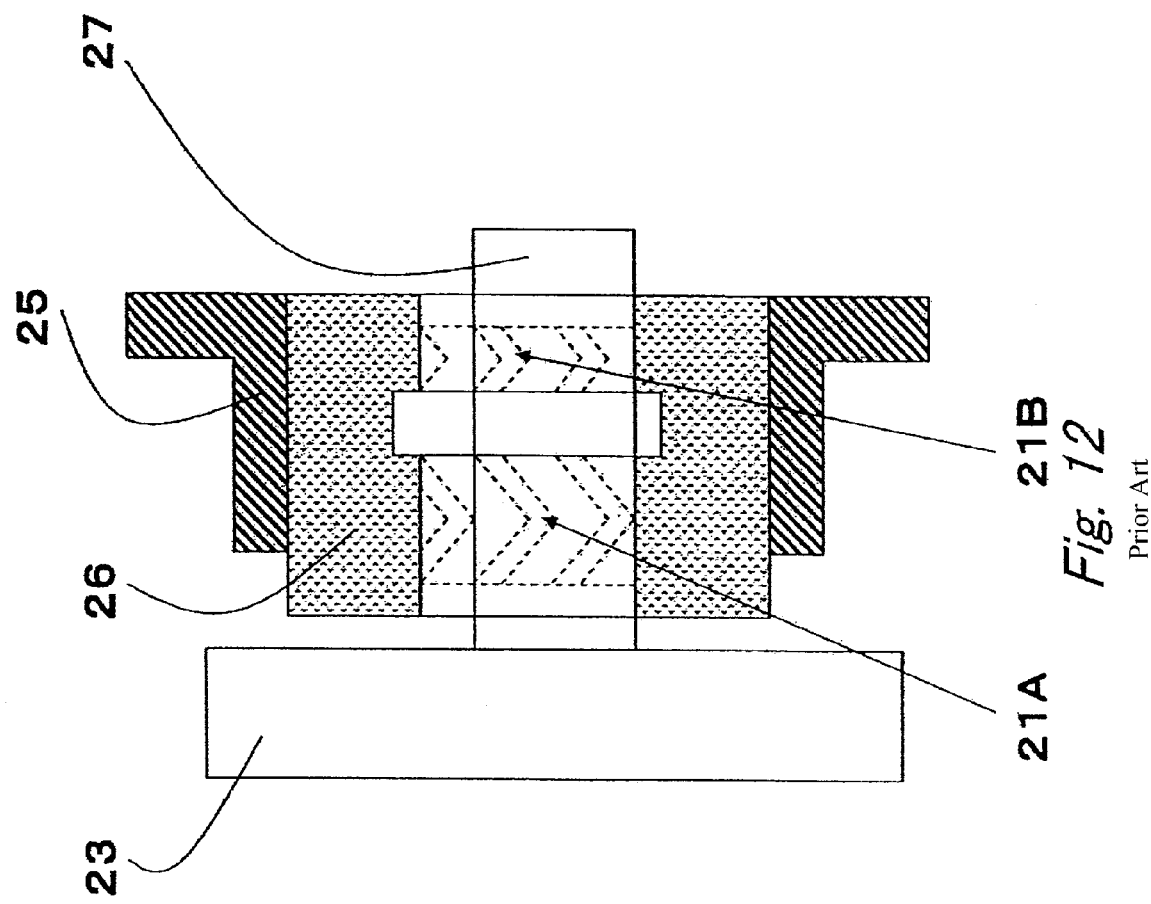
FIG. 12 is a cross-sectional diagram showing a structure of a conventional hydrodynamic bearing type rotary device.
Figure 13:
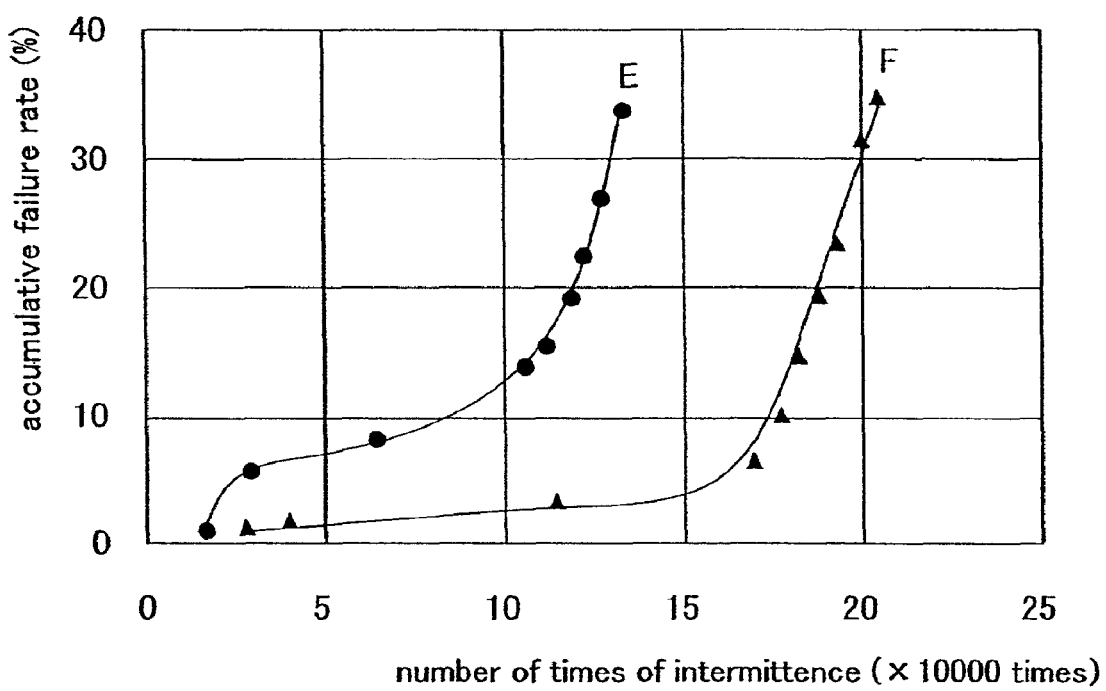
FIG. 13 is a graph showing bearing life in a conventional hydrodynamic bearing type rotary device.

In such an example, if the absolute viscosity of the gas is set as I=0.00001 (constant) as if it is an incompressible fluid, the result matches the intermittence life actual value as shown in FIG. 9. Thus, the intermittence life of the hydrodynamic bearing type rotary device can be estimated.

$$Nd = I/(S \cdot F \cdot f \cdot P \cdot D) \tag{4}$$

S: Material wear rate S=74800 (constant)
I: Viscosity corresponding constant I=0.00001
P: Load applied to one radial bearing [N]
D: Shaft diameter [m]

The radial floating rotation corresponding function, Ff, is defined as follows.

$$Ff = P/(Fs \times \omega) \quad (5)$$

ω: Constant angular velocity of the rotary device [rad/S] (=2·π·f/60)

The stiffness corresponding function, Fs, is defined as follows.

$$Fs = (I \cdot \omega \cdot D^2 \cdot L^2)/C^3 \, [N/m] \quad (6)$$

L: Length of bearing [m]
C: Bearing radial gap (B)

In the above embodiments and examples, the shaft 2 rotates and the sleeve 1 is sealed to have a shape like a bag in the bearing. However, the present invention is not limited to such an example.

For example, the present invention may be applied to a bearing rotary device in which both ends of a shaft are fixed and a sleeve can rotate as shown in FIG. 1 of U.S. Pat. No. 5,112,142 (Hydrodynamic Bearing).

In such an example, the present invention can be applied as long as the hydrodynamic bearing rotary devices has a substantially straight bearing gap without a step portion, which corresponds to letter Lr shown in FIG. 1 in the above embodiment, and has an oil reservoir which is connected to the oil of the radial bearing surface either on an upper side or a lower side.

(C)

In the above embodiment, the present invention is applied to the hydrodynamic bearing type rotary device. However, the present invention is not limited to such an example.

Figure 14:
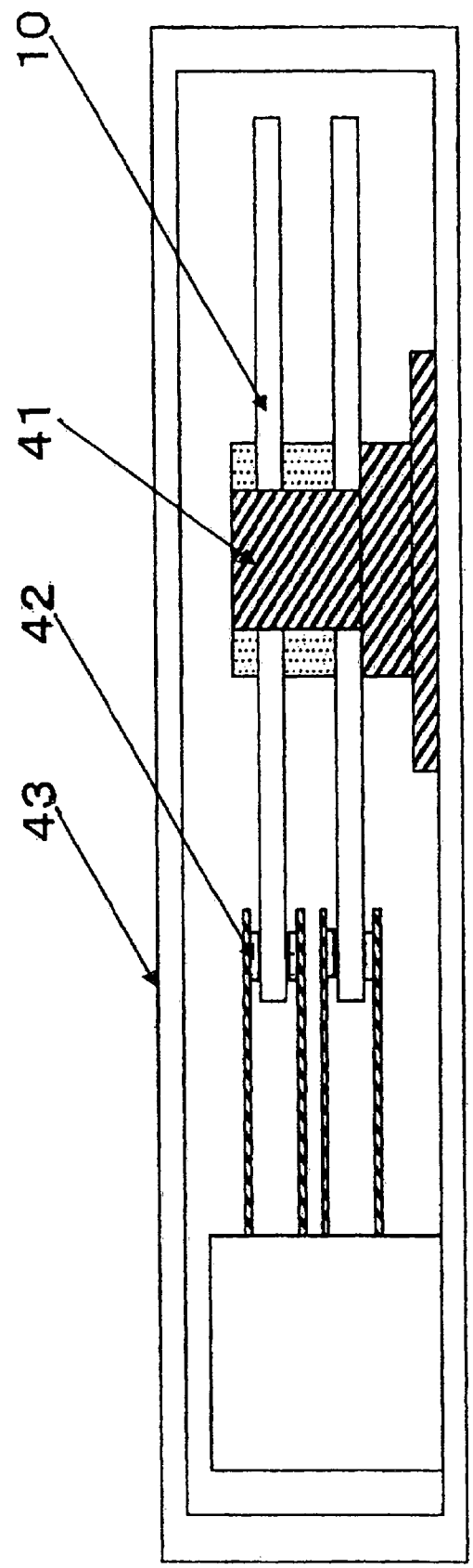
FIG. 14 shows a recording and reproducing apparatus including the hydrodynamic bearing type rotary device of the present invention.

For example, as shown in FIG. 14, the present invention may be applied to a recording and reproducing apparatus 43 which includes a hydrodynamic bearing mechanism 40 having a structure as described above and a hydrodynamic bearing type rotary device 41, and in which a recording head 42 reproduces information recorded on a recording disc 10 or records information on the recording disc 10.

With such a structure, a recording and reproducing apparatus having a high reliability can be obtained without compromising performance and/or quality.

(D)

In the above embodiment, the present invention is explained using radial bearing surface model. However, the present invention is not limited to such an example.

For example, the present invention may be applied to a radial component of conical bearing surface. Thinking in worst case, a value of shaft diameter is defined as a maximum value of conical diameter for example.

According to the present invention, abnormal wear is not generated even in use under a high temperature. Thus, a hydrodynamic bearing type rotary device having a high reliability which is required for a general consumer product such as a disc rotary device and the like. Thus, the present invention can also be applied to a hydrodynamic bearing type rotary device which is used for a special purpose which has substantially no wear and can be used semi-permanently.

The invention claimed is:

1. A hydrodynamic bearing type rotary device, comprising:
   a sleeve having a bearing hole and an inner peripheral surface and being formed of a first material having a first elastic limit;
   a shaft having an outer peripheral surface and being formed of a second material having a second elastic limit, and which is inserted into the bearing hole of the sleeve so as to be relatively rotatable, a gap being formed between the shaft and the sleeve;
   a hub rotor which is attached to either of the sleeve or the shaft, and which rotates;
   a bearing surface having hydrodynamic grooves formed on at least one of the outer peripheral surface of the shaft or the inner peripheral surface of the sleeve; and
   an ester oil held in the gap between the shaft and the sleeve, wherein
   a value of a function (Nd) represented by the following relational expression (1) is 1,000,000 or higher, such that surface pressure at the bearing surface when the shaft and the sleeve contact each other is within the first elastic limit of the first material of the sleeve and the second elastic limit of the second material of the shaft, and
   an absolute viscosity of the ester oil is in a range from 2 to 5 centipoises (0.002 to 0.005 [N·S/m^2]) at 70° C.:

$$Nd = \eta/(S \cdot Ff \cdot P \cdot D) \quad (1)$$

S: Material wear rate S=74800 (constant)
   η: Absolute viscosity at 70° C. [N·S/m^2]
   P: Load applied to one bearing [N]
   D: Shaft diameter [m],
   the floating rotation corresponding function, Ff, is defined as follows:

$$Ff = P/(Fs \times \omega) \quad (2)$$

ω: Constant angular velocity of the rotary device [rad/S], and
   the stiffness corresponding function, Fs, is defined as follows:

$$Fs = (\eta \cdot \omega \cdot D^2 \cdot L^2)/C^3 \, [N/m] \quad (3)$$

L: Length of bearing [m]
   C: Bearing gap [m].

2. The hydrodynamic bearing type rotary device according to claim 1, wherein
   the gap formed between the sleeve and the shaft has a width in a radial direction of 1 μm or longer and is substantially constant.

3. The hydrodynamic bearing type rotary device according to claim 1, wherein:
   the shaft is formed of any one of stainless steel, high manganese chrome steel, or carbon steel; and
   the sleeve is formed of a material obtained by treating stainless steel or copper alloy with electroless nickel plating, or DLC coating, sintered alloy including 90% or more iron, or a material obtained by forming a triiron tetroxide film on a surface of the sintered alloy including 90% or more iron.

4. The hydrodynamic bearing type rotary device according to claim 1, wherein:
   the shaft has a diameter in a range from 2.0 to 6.0 mm and a rotational rate in a range from 360 to 15,000 rpm; and
   a length of the bearing hole provided on the inner peripheral surface of the sleeve is in a range from 3.0 to 20.0 mm.

5. The hydrodynamic bearing type rotary device according to claim 1, wherein surface roughness of the sleeve inner surface opposing the shaft is in a range from 0.01 to 1.60 μm.

6. A recording and reproducing apparatus including a hydrodynamic bearing type rotary device according to claim 1.

7. The hydrodynamic bearing type rotary device according to claim 1, wherein a surface roughness of the sleeve inner surface opposing the shaft is in a range from 0.01 to 1.60 µm; and a surface roughness of the shaft is in a range from 0.01 to 0.2 µm, so as to obtain a predetermined wear resistance.

8. The hydrodynamic bearing type rotary device according to claim 1, wherein the sleeve and the shaft are configured to bear a load of up to about 300 grams when the ester oil is held in the gap between the shaft and the sleeve.

* * * * *